United States Patent [19]

Charboneau et al.

[11] Patent Number: 4,774,626
[45] Date of Patent: Sep. 27, 1988

[54] PRESSURE SENSOR WITH IMPROVED CAPACITIVE PRESSURE TRANSDUCER

[75] Inventors: Thomas J. Charboneau, Plainville; Keith W. Kawate, Attleboro Falls, both of Mass.

[73] Assignee: Texas Instruments Incorporated, Dallas, Tex.

[21] Appl. No.: 97,002

[22] Filed: Sep. 16, 1987

Related U.S. Application Data

[62] Division of Ser. No. 859,566, May 5, 1986, Pat. No. 4,716,492.

[51] Int. Cl.[4] ............................................. H01G 7/00
[52] U.S. Cl. .................................................... 361/283
[58] Field of Search ................... 361/283; 73/718, 724

[56] References Cited

U.S. PATENT DOCUMENTS

| | | | |
|---|---|---|---|
| 4,178,621 | 12/1979 | Simonelic et al. | 361/283 |
| 4,227,419 | 10/1980 | Park | 73/724 |
| 4,380,041 | 4/1983 | Ho | 361/283 |
| 4,389,895 | 6/1983 | Rud | 73/724 |
| 4,425,799 | 1/1984 | Park | 73/718 |
| 4,490,773 | 12/1984 | Moffatt | 361/283 |

FOREIGN PATENT DOCUMENTS

| | | | |
|---|---|---|---|
| 31032 | 2/1985 | Japan . | |
| 2059071 | 4/1981 | United Kingdom | 73/724 |

Primary Examiner—Donald A. Griffin
Attorney, Agent, or Firm—James P. McAndrews; John A. Haug; Melvin Sharp

[57] ABSTRACT

A pressure sensor comprises an improved capacitive pressure transducer having a first capacitor plate secured to a limited portion of a first surface of a relatively rigid ceramic substrate and having a diaphragm with an electrically conductive surface forming a second capacitor plate, the diaphragm being secured to the ceramic substrate at a location spaced inwardly from the periphery of that first substrate for disposing the second capacitor plate in spaced, overlying relation to the first capacitor plate to be movable in response to applied pressure for varying the capacitor formed by the plates. Support means bear against opposite surfaces of the ceramic substrate at the periphery of the substrate for mounting the transducer with the diaphragm thereof substantially free of mounting stresses to be exposed to a pressure force in a pressure zone to be monitored.

6 Claims, 3 Drawing Sheets

PRESSURE SENSOR WITH IMPROVED CAPACITIVE PRESSURE TRANSDUCER

This application is a division of application Ser. No. 859,566 filed May 5, 1986, now U.S. Pat. No. 4,716,492.

BACKGROUND OF THE INVENTION

The field of this invention is that of pressure sensors having capacitive pressure transducers and the invention relates more particularity to a pressure sensor having a novel and improved capacitive pressure transducer for providing accurate pressure responses in varying environmental conditions such as those encountered in automotive applications and the like.

Pressure sensing devices using capacitive pressure transducers have been previously known but have tended to sense pressure changes with less than fully desirable precision, have been difficult to calibrate, or have had response characteristics which have been undesirably sensitive to variations in temperature and mounting stresses in certain environmmental conditions.

SUMMARY OF THE INVENTION

It is an object of this invention to provide a novel and improved sensor; to provide a pressure sensor having a novel and improved capacitive pressure transducer; to provide such an improved transducer which is easily scalable to be employed in sensing various ranges of pressure, which is easily, inexpensively and reliably manufactured, which precisely varies in capacitance in response to changes in applied pressure, and which is relatively insensitive to variations in temperature, mounting stresses and the like when used in automotive enviromental conditions; and to provide a pressure sensor which is easily and reliably calibrated.

Briefly described, the novel and improved sensor of this invention comprises a capacitive transducer having a relatively rigid ceramic substrate and having a first electrically conductive capacitor plate mounted on a limited portion of a first surface of the ceramic substrate. The transducer also has a movable member serving as a pressure responsive diaphragm having an electrically conductive surface portion forming a second capacitor plate. The movable member is mounted on the first surface of the ceramic substrate at a location spaced inwardly from the periphery of the first substrate surface to be disposed in spaced, overlying relation to the first capacitor plate to move in response to a change in pressure or other condition to vary transducer capacitance in a manner corresponding to the changing condition. Means are provided for connecting the capacitor plates in an electrical circuit. The sensor further includes support means which bear against the periphery of the first surface of the relatively rigid substrate adjacent the periphery of the substrate and against an opposite surface of the substrate for securely mounting the transducer against shock and vibration to expose the transducer diaphragm to a fluid pressure or the like in a pressure zone to be monitored while assuring that the transducer diaphragm is relatively free of stresses associated with mounting of the transducer. Electronic means such as an integrated circuit are mounted on the support or even directly on an opposite surface of the relatively rigid ceramic substrate and are connected to the capacitor plates through openings in the substrate or the like to provide an electrical output signal corresponding to the changes in capacitance provided by the transducer.

In accordance with the invention, the movable member preferably comprises metal or ceramic materials having coefficients of thermal expansion corresponding to the thermal expansion properties of the ceramic substrate. In one embodiment for example, a cup-shaped member has a relatively rigid rim secured to the first ceramic substrate surface at a location spaced inwardly from the periphery of the substrate surface disposing a bottom of the cup in selected, spaced, overlying relation to the first capacitor plate and the cup bottom has an inner, electrically conductive surface serving as the second capacitor plate, the bottom being resiliently flexible to serve as a diaphragm to move the second plate toward and away from the first capacitor plate in response to variation in fluid pressure force or the like applied to an outer surface of the cup bottom. In one preferred embodiment, the cup is formed of a metal material selected to have a relatively low coefficient of thermal expansion corresponding to that of the substrate and the cup bottom itself serves as the second capacitor plate. In another preferred embodiment, the cup is formed of a ceramic material proportioned to provide a resiliently flexible ceramic cup bottom and a layer of electrically conductive metal is secured to the inner surface of the ceramic cup bottom to serve as the second capacitor plate. In other preferred embodiments, the metal cup and the first capacitor plate and/or the layer of metal material forming the second capacitor plate are formed of a composite metal laminate having at least one layer of metal of relatively high electrical conductivity metallurgically bonded to at least one other layer of metal of relatively low coefficient of thermal expansion such that the composite metal laminate layers cooperate to provide the laminate with an effective coefficient of thermal expansion corresponding to that of the ceramic substrate.

In another preferred embodiment of the invention, the movable diaphragm member comprises a flat, sheet-like metal or ceramic diaphragm element secured to the ceramic substrate in selectively spaced relation to the substrate by disposing a spacing and securing medium between the flat diaphragm and the substrate at a location spaced inwardly from the substrate periphery. In one preferred embodiment of the invention, the securing medium preferably comprises a mixture of a glass frit and an organic binder with a plurality of balls of glass or the like of selected diameter. The glass frit is selected to be fusible at a first temperature at which the material of the balls remains unfused and the mixture is then heated to that fusing temperature of the frit to vaporize and drive off the binder and secure the diaphragm to the substrate at a spacing from the substrate precisely predetermined by the diameter of the balls.

In this way, a novel and improved low cost pressure sensor is provided. The improved capacitive transducer has a diaphragm which is easily scaled to be responsive to any selected range of fluid pressures or the like. The transducer is easily, inexpensively and reliably supported in the sensor to be mounted relative to a pressure zone to be monitored in a manner which permits the diaphragm to be relatively free of stresses associated with the transducer or sensor mounting. The transducer and its mounting in the sensor are particularly advantageous in being relatively insensitive to variations in temperature and various environmental conditions to be useful in automotive applications and the like. Where the pressure transducer is adapted to be manufactured and mounted with precision to be relatively insensitive to shock, vibration, and temperature variations as described, the required range of adjustment is kept within practical limits and the pressure sensor is particularly adapted to be easily and reliably calibrated by adjustment of electronic means or the like incorporated in the sensor.

DESCRIPTION OF THE DRAWINGS

Other objects, advantages and details of the novel and improved sensor and capacitive pressure transducer of this invention appear in the following detailed description of preferred embodiments of the invention, the detailed description referring to the drawings in which.

DESCRIPTION OF THE PREFERRED EMBODIMENTS

Figure 1:
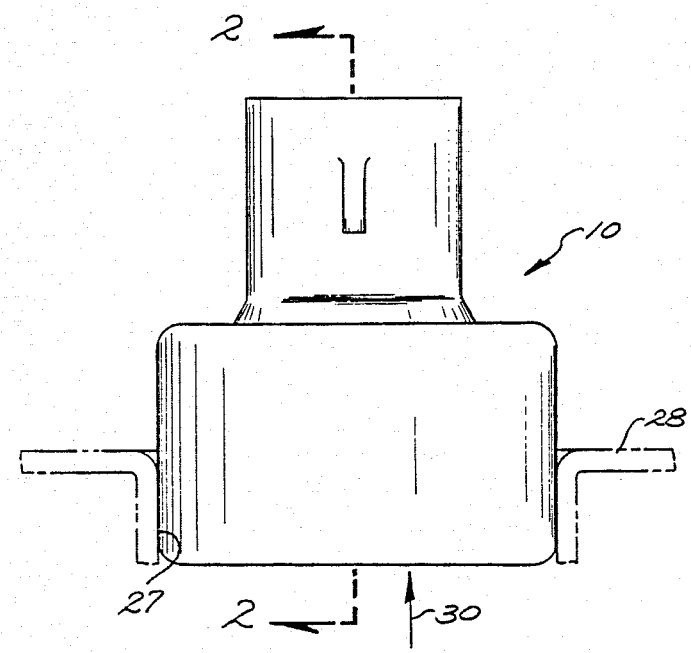
FIG. 1 is a front elevation view of one preferred embodiment of the novel and improved pressure sensor of this invention.
Figure 2:
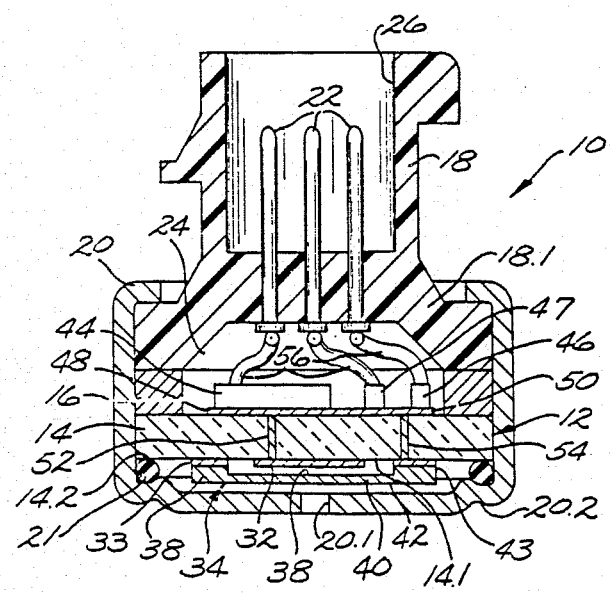
FIG. 2 is a section view along line 2—2 of FIG. 1.

Referring to the drawings, 10 in FIGS. 1 and 2 indicates the novel and improved sensor of this invention which is shown to comprise a capacitive transducer 12 (See FIG. 2) which includes a ceramic substrate 14 formed of alumina or fosterite ceramic or the like. The capacitive transducer is preferably secured against one side of an annular metal or plastic strength member or support. Typically the support comprises a metal ring 16 and a sensor support body 18 preferably formed of a molded thermoplastic or the like is secured to an opposite side of the support ring. Alternately, the noted ring is provided as part of the support body 18. A cup-shaped metal support cap 20 of steel or the like is swaged over an O-ring gasket 21 at a peripheral portion of the transducer substrate, the strength member, and a portion of the body for securing those members together for mounting the transducer in the sensor 10. Preferably three electrically conductive terminals 22 are molded into or otherwise attached to the body extending from a chamber 24 formed in the body and a protective sleeve 26 is fitted around the terminals to permit electrical connection to be made to the terminals from outside the body. The cap 20 is adapted to fit into an opening 27 in a well 28 for permitting the sensor to be exposed to a fluid pressure or the like in the well as indicated by the arrow 30 in FIG. 1, the sensor cap having an opening 20.1 for exposing the capacitive transducer 12 to that fluid pressure. Clamping of the O-ring gasket 21 between the cap 20 and a peripheral portion of the transducer substrate seals the sensor with respect to the pressure 30. Although the sensor cap is shown being received with a press fit in the opening 27, it will be understood that the cap is also adapted to be provided with gasket seal means or with screw threads to threadedly engage corresponding threads in such a well for sealingly securing the sensor in the well.

In accordance with the invention, the ceramic substrate 14 has sufficient thickness for providing the substrate with significant rigidity and the substrate is secured firmly against the strength member 16. An electrically conductive metal 32 is formed on a limited portion of one surface 14.1 of the substrate spaced inwardly from the periphery 14.2 of the substrate to serve as a first fixed capacitor plate in the capacitive transducer 12. In one preferred embodiment of the invention, the first capacitor plate is formed on the ceramic substrate 14 by selective sputtering of aluminum to provide good adherence to the ceramic substrate. Alternatively any other conventional means for providing an electrically conductive first capacitor plate 32 on a limited portion of one surface of the substrate 14 is within the scope of this invention.

In accordance with the invention, a movable member having an electrically conductive surface portion for forming a second movable capacitor plate is secured to a portion of the ceramic substrate 14 spaced inwardly from the periphery of the substrate so that the second movable capacitor plate is disposed in spaced, overlying relation to the first fixed capacitor plate to form a variable capacitor in the capacitive transducer 12 while leaving the peripheral portion 14.2 of the rigid transducer substrate accessible for convenient secure gripping during mounting of the transducer. In one preferred embodiment of the invention, the movable member comprises a cup-shaped metal diaphragm element 34 as shown in FIG. 2 having a side wall and having a rigid rim 36 secured to said one surface 14.1 of the ceramic substrate for disposing the inner surface 38 of the cup bottom 40 in spaced, overlying relation to the first capacitor plate 32 to serve as the second movable capacitor plate of the transducer. The bottom of the cup has a selected thickness and resilient flexibility to serve as a pressure responsive diaphragm to be movable toward and away from the first capacitor plate 32 to an extent which is proportional to the pressure force is proportional to the pressure force 30 which is applied to the outer surface 42 of the cup as will be understood. In one preferred embodiment of the invention, the cup rim is secured by soldering or brazing to an annulus 33 of metal material such as molybdenum-manganese alloy adhered to the substrate 14 by a selective thick film deposition such as screen printing or the like. Preferably the cup-shaped diaphragm element is formed of a metal material having a coefficient of thermal expansion corresponding to that of the ceramic substrate. In one of the preferred embodiments for example, the cup-shaped element is formed of a low expansion metal alloy such as an alloy having a nominal composition by weight of 42% nickel and the balance iron, that alloy being commonly called Alloy 42. The cup is formed by drawing or machining or in other conventional manner as may be preferred.

The metal cap 20 is then swaged or otherwise formed as shown at 20.2 in FIG. 2 to capture and compress the O-ring 21 to bear against the peripheral portion 14.2 of one surface 14.1 of the rigid substrate to clamp an opposite surface of the substrate firmly and securely against the support ring 16 or the like, thereby to conveniently mount the transducer 12 in the sensor 10 to be secure against shock and vibration while retaining the diaphragm portion 40 of the transducer substantially free of mounting stresses even during substantial temperature changes. The capacitor plates of the capacitive transducer 12 are connected in an electrical circuit in a sensor device for providing a variable capacitance in the circuit which is representative of the pressure 30 which is applied to the transducer, whereby the sensor provides an electrical output signal corresponding to that fluid pressure. In one preferred embodiment of the invention, such an electrical circuit is at least partially embodied in an electronic means such as an integrated circuit unit 44 which is mounted on an opposite side of the ceramic substrate 14 to be accommodated in the body chamber 24. If desired, where the desired electrical circuit also comprises one or more discrete components such as capacitor 46 and variable resister 47 or the like for forming a hybrid circuit as diagrammatically illustrated in FIG. 2, such discrete components are also mounted on the opposite substrate surface. In one preferred embodiment for example, circuit path means 48 and 50 are formed on the opposite substrate surface as illustrated in FIG. 2 and plated-through holes or vias 52 and 54 are established in the substrate for electrically connecting the first and second capacitor plates in the desired electrical circuit as diagrammatically illustrated in FIG. 2. The noted electrical circuit provided on the opposite substrate surface is electrically connected to the sensor terminals 22 by lead wires 56 as will be understood for permitting the sensor to be electrically connected in an electrical circuit outside the sensor. If desired, the sensor body 18 can be formed of metal or lined with metal for providing electro-magnetic magnetic shielding for the electronic circuit means in the sensor.

In that arrangement, the sensor 10 is adapted to be mounted in a well in an automotive air-conditioning control system or the like for determining a fluid pressure level existing in the well in the system. The transducer 12 is securely mounted in the sensor to be shock and vibration resistant for use in an automatic environment. The movable member is movable in response to variations in fluid pressure in the well for moving the second capacitor plate relative to the first plate to provide a variable capacitance which varies with the pressure in the well. The capacitor plates are connected in an electrical circuit in the sensor to provide an electrical output signal corresponding to the variable pressure for transmission to an automotive computer control system or the like. Pressure sensors having capacitor pressure transducers cooperating with electronic circuit means for providing analog output signals corresponding to variable pressures are well known so that the electronic means used with the sensor 10 are not further described herein and it will be understood that any conventional electronic means are used in the sensor 10 within the scope of this invention. Preferably for example, the sensor comprises electronic means such as those described in the commonly owned, co-pending application Ser. No. 859,561 filed of even date herewith for, "Low Cost Precision Sensor", the disclosure of which is incorporated herein by this reference. The capacitive changes provided by the capacitive transducer 12 are relatively independent of temperature changes even where the sensor 10 is used in automotive applications where the transducer is likely to be subjected to wide swings in temperature. The transducer structure is adapted to be easily and reliably manufactured with precisely predetermined physical and electrical characteristics and is easily scalable to be responsive to any selected range of pressures applied to the resiliently flexible bottom of the movable member or element. Where the capacitor transducer is completely embodied on the single ceramic substrate and where the transducer is mounted in the sensor by gripping of the peripheral portion of that single ceramic substrate as described, the transducer is easily provided with desired characteristics and is assembled in the sensor 12 without disturbing those characteristics; further, where such precise control of transducer characteristics as mounted in the sensor are achieved, only relatively limited calibration is required such that calibration is easily accomplished by adjustment of the electronic means in the sensor through the body opening 18.1 or the like as is more fully described in the noted commonly owned co-pending application for patent.

Figure 3:
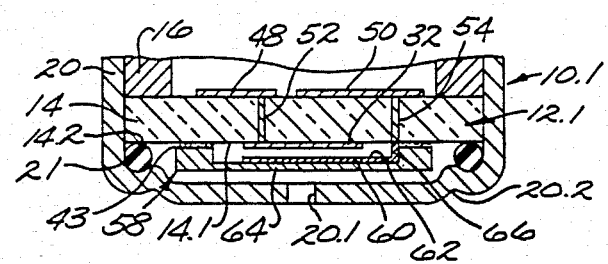
FIG. 3 is a partial section view similar to FIG. 2 illustrating an alternate preferred embodiment of the invention.

In another alternate preferred embodiment of the invention, as shown at 10.1 in FIG. 3 (where corresponding components are identified by corresponding reference numerals), the cup-shaped member in a transducer 12.1 is formed of a material preferably corresponding to that of the substrate 14 as indicated at 58 in FIG. 3. In that arrangement, a layer of electrically conductive metal material 60 such as aluminum is deposited in adherent relation to the inner surface 62 of the bottom 64 of the ceramic cup to serve as the second capacitor plate, the thickness of the ceramic cup bottom means being selected to have the resilient flexibility of a diaphragm for providing the described response to variations in fluid pressure on the cup bottom. In this arrangement, a portion of the conductive metal layer extends from the second capacitor plate as indicated at 66 in FIG. 3 for electrically connecting the second plate to the via 54 as will be understood. In this arrangement, relatively better control of thermal coefficient of expansion is achieved at reasonable cost in the capacitive transducer.

Figure 4:
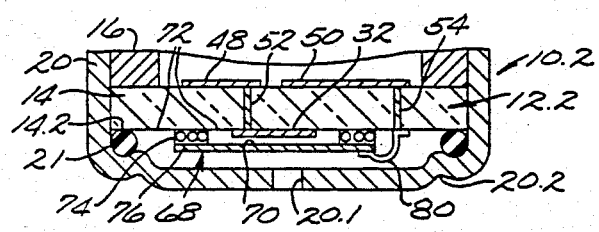
FIG. 4 is a partial section view similar to FIG. 2 illustrating another alternate preferred embodiment of the invention.

In another alternate preferred embodiment of the invention, as shown at 10.2 in FIG. 4, the movable diaphragm member utilized in the pressure transducer 12.2 comprises a resiliently flexible metal sheet member 68 having an electrically conductive inner surface 70 disposed in selected spaced relation to the first capacitor plate 32 to form the second capacitor plate. The diaphragm member is preferably secured in the desired spaced relation to the first capacitor plate by providing the ceramic substrate with two, inner and outer, concentric annular grooves 72. A mixture 74 of a glass frit 76 and a plurality of small balls 78 of glass or ceramic or the like in a suitable organic binder or the like is deposited between the ceramic substrate 14 and the inner surface 70 of the flat diaphragm so the mixture is confined in the space between the two concentric grooves 72. If desired, small cylinders of glass or ceramic fiber of desired diameter are used in place of the balls. The spacing of the inner surface 70 of the diaphragm from the first capacitor plate 32 is determined by the diameter of spherical balls 78. The glass frit is selected to be fusible at a first selected temperature and the material of the balls is selected so they are not fusible at that temperature. The glass frit is then fused at said first temperature for burning off the binder material and sealingly securing the flat diaphragm in the desired spaced relation relative to the first capacitor plate 32. The lead 80 brazed or soldered to the diaphragm and to the via 54 then serves to connect the second capacitor plate in the sensor circuit. If desired, the space between the first and second capacitor plates is sealed as shown for excluding extraneous materials from between the plates, or, if desired, a space between the plates may be placed under vacuum or may be vented as by means of an opening through one of vias. This arrangement of the invention achieves good control of transducer assembly at reasonable cost.

Figure 5:
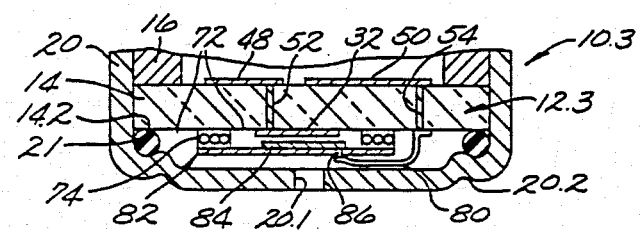
FIG. 5 is a partial section view similar to FIG. 2 illustrating another alternate preferred embodiment of the invention.

In another preferred embodiment as shown at 10.3 in FIG. 5, the flat flexible diaphragm sheet member in the transducer 12.3 is formed of a ceramic material as indicated at 82 in FIG. 5, the thickness of the ceramic sheet member being selected to provide the diaphragm with the desired strength and resilient flexibility for serving as a pressure responsive diaphragm as above described. Use of the ceramic diaphragm achieves easier matching of thermal coefficient of expansion between the ceramic diaphragm and the ceramic substrate 14. In this preferred embodiment, the diaphragm has a metal 84 deposited in adherent relation to an inner surface of the ceramic diaphragm and, a plated via 86 is provided in the ceramic substrate for electrically connecting the second capacitor plate to the via 54 by means of another lead 80.

Figure 6:
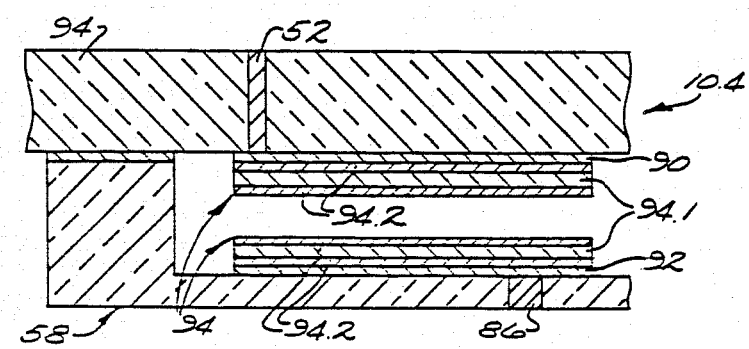
FIG. 6 is a partial section view similar to FIG. 2 to greatly enlarged scale illustrating another alternate preferred embodiment of the invention.

In another preferred embodiment as shown at 10.4 in FIG. 6, metal layers corresponding to layers 32 and 60 or 84 as previously described are formed of a composite metal laminate material having a plurality of metal layers formed of selected materials having selected thicknesses in the layers such that the laminate material has a selected, relatively high electrical conductivity while also having a coefficient of thermal expansion preferably corresponding to that of the ceramic substrate 14. Preferably for example, an adherent electrically conductive metal layer is deposited at 90 on the ceramic substrate 14 in a transducer 12.4 and at 92 on an inner surface of a ceramic diaphragm cup 58 by sputtering or the like. Foils of a composite metal laminate 94 each having a core layer 94.1 of invar and opposite outer surface layers 94.2 of copper metallurgically bonded to the core layer are then brazed or soldered to the deposited layers 90, 92 respectively in any conventional manner for forming the first and second capacitor plates. The foils are electrically connected to the vias 52 and 86 as will be understood. In that arrangement, the capacitor plates are provided with relatively high electrical conductivity while also having thermal coefficient of expansion characteristics substantially matching those of the ceramic substrate 14 and the ceramic cup 58. The metal cup member 34 or the metal sheet diaphragm 68 described with reference to FIGS. 1 and 4 respectively are also adapted to be formed of such a composite metal laminate or comparable metal laminates formed of similar materials having the relatively high conductivity layers disposed at the outer surfaces of the capacitor plates within the scope of this invention.

Figure 7:
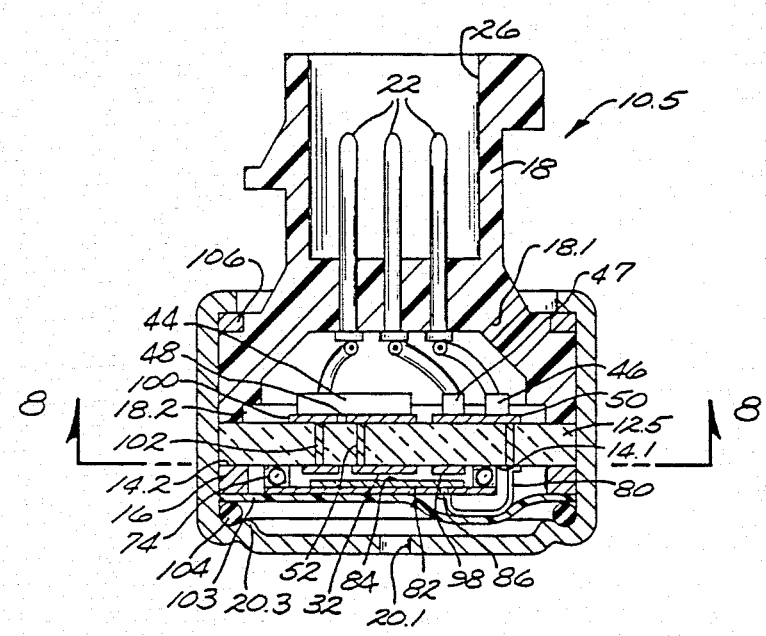
FIG. 7 is a section view similar to FIG. 2 illustrating another preferred embodiment of the pressure sensor of this invention.
Figure 8:
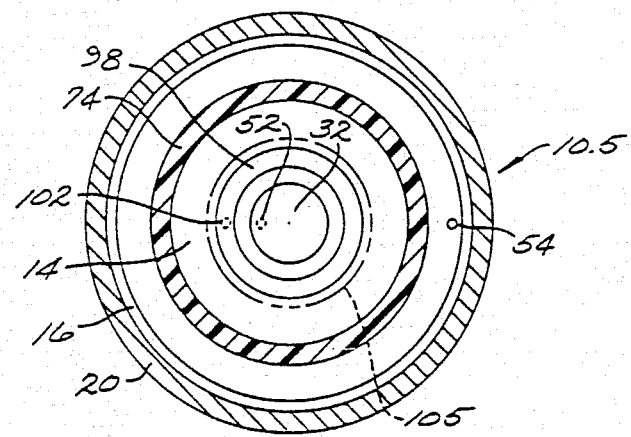
FIG. 8 is a section view along line 4—4 of FIG. 3.

In another alternate preferred embodiment as shown at 10.5 in FIGS. 7 and 8, a transducer 12.5 preferably comprises a substrate 14 having a first capacitor plate 32 connected to a circuit path 48 by a via 52 and has an additional metal guard ring 98 deposited on the substrate surface 14.1 in surrounding relation to the capacitor plate 32 connected in the sensor circuit by circuit path 100 and via 102 to be at the same typical potential as the plate 32 as will be understood. A ceramic diaphragm 82 carrying a second capacitor plate 84 is connected in the sensor circuit by means of via 86, lead 80, via 54 and circuit path 50 as above described, the securing medium 74 being arranged as shown for securing the diaphragm to the substrate leaving a peripheral portion 14.2 of the substrate accessible to be gripped by support means for mounting the transducer in the sensor. Preferably a dielectrically stable, electrically insulating film is deposited on the substrate 14 over the capacitor plate 32 and guard ring 98 in adherent relation thereto as is shown diagrammatially at 105 only in FIG. 8. If desired, a corresponding film is deposited on the diaphragm 82 over the second capacitor plate 84. These films serve to prevent accidental electrical shorting between the capacitor plates and/or guard ring if small conductive particles should be inadvertently trapped inside the transducer between the plates and ring. In this embodiment of the invention, a metal support ring 16 is disposed at one side of the substrate periphery bearing against the peripheral portion 14.2 of the surface 14.1 and the body 18 provides another supporting portion 18.2 to bear against an opposite surface of the substrate. An O-ring gasket 104 is arranged to bear against the lower support ring 16. A pliable plastic or organic sheet material 103 such as a sheet of teflon-coated polyimide material or the like is disposed with its margin between the O-ring 104 and the support ring 16 to extend over the transducer 12.5. The metal support cap 20 is swaged as at 20.3 to capture the O-ring gasket 104 and hold it securely against the lower support ring 16 for securely gripping the periphery of the transducer substrate 14 between the support rings 16 and 18.2. In that arrangement, the gasket 104 and plastic sheet 103 seal the sensor electronics from the fluid pressure while also providing secure mounting of the transducer in the sensor. In an alternate sealing arrangement, the lower support ring 16 and the pliable sheet 103 are omitted and the O-ring gasket 104 is seated directly against the periphery 14.2 of the transducer substrate to provide corresponding sealing when clamped by the cap 20. In preferred embodiments of the invention, the ceramic substrate and diaphragm components are preferably glazed for providing moisture sealing or maintaining a desired vacuum. Preferably a corresponding O-ring gasket 106 is accommodated in a gasket groove in the sensor body 18 as shown in FIG. 7 to serve as a weather seal as the cap 20 is swaged for mounting the transducer. It should be understood that although preferred embodiments of the invention have been described by way of illustrating the invention, this invention includes all modifications and equivalents of the disclosed embodiments following within the scope of the appended claims.

We claim:

1. A pressure sensor comprising a capacitive pressure transducer having a ceramic substrate, a first electrically conductive capacitor plate secured to one surface of the substrate, a flexible ceramic sheet forming a diaphragm, a second electrically conductive capacitor plate secured to one surface of the flexible ceramic sheet, a mixture of a glass frit fusible at one temperature and of a plurality of elements with portions of a selected diameter of a material which retains its shape at said one temperature disposed between portions of said one surface of the ceramic substrate and the flexible ceramic sheet member for disposing the first and second capacitor plates in precisely spaced relation to each other as determined by the diameter of said element portions to form a capacitor, the glass frit being fused at said one temperature for securing the first and second capacitor plates in said precisely spaced relation to permit the second capacitor plate to be movable in response to application of pressure to an opposite surface of the flexible ceramic sheet for varying the capacitance of the capacitor in response to changes in pressures applied to the flexible ceramic sheet, and connector means for electrically connecting the first and second capacitor plates in an electrical circuit; support means attached to the transducer forming a chamber between the support means and transducer for mounting the transducer to be exposed to a pressure in a zone to be monitored; and electrical circuit means disposed in the chamber and electrically connected to said connector means for providing an electrical signal corresponding to said pressure changes; the support means comprising housing means having an opening therein for exposing the flexible ceramic sheet of the transducer to said fluid pressure and seal means between the transducer and housing means sealing the electrical circuit means within the chamber from said fluid pressure.

2. A pressure sensor according to claim 1 further characterized in that said sealing means comprise a pliable film of organic material disposed in overlying relation to said flexible ceramic sheet of the transducer, and an O-ring gasket clamped between the housing means and a portion of the film overlying the flexible ceramic sheet in sealing relation to the transducer.

3. A pressure sensor according to claim 1 wherein said electrical circuit means includes means mounted in the chamber for calibrating the sensor.

4. A pressure sensor according to claim 3 wherein said electrical circuit means include discrete capacitor means and integrated circuit means forming hybrid circuit means in said chamber.

5. A pressure sensor according to claim 3 wherein said housing means has an opening therein permitting access to said electrical circuit means in said chamber for permitting calibration of the sensor.

6. A pressure sensor according to claim 1 wherein a metal guard ring is provided on said one surface of the ceramic substrate in surrounding relation to said first capacitor plate, and connector means connect said guard ring to said electrical circuit means to be held at substantially the same potential as the first capacitor plate.

* * * * *